United States Patent
Hsieh et al.

(10) Patent No.: US 7,440,371 B2
(45) Date of Patent: Oct. 21, 2008

(54) UNBALANCED DISC DETECTION AND READING SPEED CONTROL IN DISC READING APPARATUS

(75) Inventors: Jen-Kuei Hsieh, Hsinchu (TW); Yi-Chuan Pan, Hsinchu (TW)

(73) Assignee: Lite-On it Corp., Taipei (TW)

( * ) Notice: Subject to any disclaimer, the term of this patent is extended or adjusted under 35 U.S.C. 154(b) by 638 days.

(21) Appl. No.: 11/176,130

(22) Filed: Jul. 7, 2005

(65) Prior Publication Data

US 2006/0010966 A1    Jan. 19, 2006

(30) Foreign Application Priority Data

Jul. 13, 2004   (TW) ............... 93120888 A

(51) Int. Cl.
*G11B 7/00* (2006.01)

(52) U.S. Cl. .................. 369/53.1; 369/53.14

(58) Field of Classification Search ............ 369/53.12, 369/53.13, 53.14, 47.36, 47.37, 47.38, 44.32, 369/53.1

See application file for complete search history.

(56) References Cited

U.S. PATENT DOCUMENTS 6,195,322 B1 * 2/2001 Ohtani et al. ............ 369/53.14
6,236,630 B1 * 5/2001 Kubo et al. ............... 369/47.36
6,636,469 B2 * 10/2003 Tomishima ............... 369/53.14
6,965,548 B2 * 11/2005 Chen ....................... 369/44.32

* cited by examiner

*Primary Examiner*—Nabil Z Hindi
(74) *Attorney, Agent, or Firm*—Kirton & McConkie; Evan R. Witt

(57) ABSTRACT

An open-loop test procedure under high rotating speed is entered to compute a first TE crossing track number. The first TE crossing track number greater than a first threshold indicates an unbalanced disc and results in a low-speed reading procedure. On the other hand, the first TE crossing track number less than a second threshold value that is less than the first threshold value indicates a normal disc and results in a high-speed reading procedure. When the first TE crossing track number lies between the first and second threshold values, another open-loop test procedure under low rotating speed is entered to compute a second TE crossing track number. A low-speed reading procedure is performed when the second TE crossing track number is greater than a third threshold value, and a high-speed reading procedure is performed when the second TE crossing track number is less than the third threshold value.

17 Claims, 6 Drawing Sheets

UNBALANCED DISC DETECTION AND READING SPEED CONTROL IN DISC READING APPARATUS

FIELD OF THE INVENTION

The present invention relates to a method for detecting whether the disc reading apparatus is reading an unbalanced disc, and further controlling the rotating speed of the unbalanced or normal disc differentially in the disc reading apparatus.

BACKGROUND OF THE INVENTION

Optical discs such as compact discs (CDs), video compact discs (VCDs) and digital versatile discs (DVDs) are generally produced by recording data on one side thereof with an electroplating process and printing disc- and/or manufacturer-related information on the other side thereof with a coating process. In addition to the difference in recorded data and coated information, the electroplating and coating processes may also vary with the implements of the disc manufacturers, so the painting distribution may differ disc by disc. Currently, even the shape of the disc is variable. An optical disc reading apparatus is required to be able to read data from discs produced by different manufacturers. For example, if the painting distribution of the optical disc is not uniform, vibration is likely rendered when the optical disc is rotating in the disc reading apparatus. Under this circumstance, the optical disc is considered unbalanced. For reading an unbalanced disc, the rotating speed has to be lowered in order to avoid errors.

An unbalanced disc can be detected out by an open-loop test procedure of the optical disc drive. In the open-loop test procedure, the optical pickup head of the optical disc drive is kept unmoved while the optical disc being read. The optical disc is rotated with a rotating shaft, and the number of tracks that the optical pickup head crosses during one single revolution of the disc is computed. In a perfectly ideal situation, there should be only one track of crossing-over detected for each revolution of the disc if the optical pickup head remains fixed. In practice, however, more or less deviation would occur, particular due to vibration of the disc. Under this circumstance, the fixed optical pickup head might relatively cross some tracks of the rotating optical disc. If the number of crossing tracks is greater than a threshold value, it means the vibration is severe and the disc is deemed an unbalanced disc.

The determination of the threshold value will be described hereinafter with reference to FIGS. 1(a) and 1(b), which are schematic perspective and side views illustrating rotation of an unbalanced disc. For purpose of neat drawing, only the rotating shaft 20 and optical pickup head 21 of the optical disc drive are schematically shown interacting with the unbalanced disc 10. For determining the threshold number of crossing tracks for discriminating a normal disc or an unbalanced disc, various unbalanced test discs are respectively subjected to the open-loop test procedure as the disc 10 first. For example, three kinds of test discs having different unbalanced levels and labeled with "3g", "5g" and "6g" are used, wherein the disc "6g" vibrates more significantly than the disc "5g" and the disc "5g" vibrates more significantly than the disc "3g". The crossing track numbers of these test discs realized according to a track error (TE) signal under high-speed rotation and certain configurations of discs have been known and shown in the scheme table of FIG. 2. In details, what is represented by the label LSB3g indicates the crossing track number detected in the open-loop test procedure with the "3g" disc standing upright and detected leftward by the optical pickup head; what is represented by the label RSB3g indicates the crossing track number detected in the open-loop test procedure with the "3g" disc standing upright and detected rightward by the optical pickup head; and what is represented by the label HB3g indicates the crossing track number detected in the open-loop test procedure with the "3g" disc placed horizontally above the optical pickup head. These arrangements are used to cover all the possible placement of the optical disc drive. Similar labels LSB5g, HB 5g, RSB5g, LSB6g, HB 6g and RSB6g in FIG. 2 denote similar meanings to those mentioned above.

By rotating the test discs under a predetermined high testing speed of rotation and detecting the resulting tracking error signals with the optical pickup head, respectively, a proper test disc is selected to set up the threshold value for discriminating a normal disc or an unbalanced disc. In the example of FIG. 2, the test disc "3g" operates under the high testing speed of rotation in this optical disc drive no matter what type of placement of the disc drive, but not for all circumstances the discs "5g" and "6g" do. Accordingly, the maximum crossing track number of the disc "3g", i.e. 225, is used as the threshold value L1 for discriminating a normal disc or an unbalanced disc. In other words, all discs detected with more than 225 crossing tracks per cycle will be considered unbalanced and read under a low reading speed of rotation. On the other hand, all discs detected with less than 225 crossing tracks per revolution will be considered normal and read under the high reading speed of rotation. However, some of the unbalanced discs would not be screened out since range considered normal (crossing track number less than 225) would cover some severe unbalanced disc with other types of placement, e.g. HB5g or HB6g, which is not suitable to operate under the high reading speed of rotation. Therefore, errors still possibly occur.

SUMMARY OF THE INVENTION

Therefore, the present invention provides a method for detecting whether the loaded disc is an unbalanced in a more precise way so that the reading speeds of the normal and unbalanced discs can be controlled differentially.

The present invention relates to a method for detecting an unbalanced disc. In the present method, a disc to be read is first loaded into an optical disc drive. Then, a first detection procedure is performed under a first rotating speed of the disc to determine whether the disc to be read is an unbalanced disc. A second detection procedure can be entered if the disc is not determined unbalanced or normal in the first detection procedure. The second detection procedure under a second rotating speed of the disc is performed to determine whether the disc is an unbalanced disc.

The first detection procedure can be an open-loop test procedure in which a first TE crossing track number per cycle rotation of the disc is computed, and determine the disc is an unbalanced disc when the first TE crossing track number per revolution of the disc is greater than a first threshold value. The second detection procedure is preferably entered when the first TE crossing track number per revolution of the disc is greater than a second threshold value and is smaller than the first threshold value. The second detection procedure can also be an open-loop test procedure in which a second TE crossing track number per revolution of the disc is computed, and determine the disc is an unbalanced disc when the second TE crossing track number per revolution of the disc is greater than a third threshold value.

In an embodiment, the first rotating speed is higher than the second rotating speed, and each of the first and second threshold values is greater than the third threshold value.

In an embodiment, a reading procedure is entered with a first reading condition when said disc is determined normal, and a reading procedure with a second reading condition is entered when said disc is determined unbalanced. The second reading condition has a maximum reading speed lower than a maximum reading speed of the first reading condition.

The present invention further relates to a method for controlling a reading speed of a disc loaded in a disc reading apparatus. In an embodiment, an open-loop test procedure under high-speed rotation is entered to compute a first TE crossing track number. The first TE crossing track number greater than a first threshold indicates an unbalanced disc and results in a low-speed reading procedure. On the other hand, the first TE crossing track number less than a second threshold value that is less than the first threshold value indicates a normal disc and results in a high-speed reading procedure. When the first TE crossing track number lies between the first and second threshold values, another open-loop test procedure under low-speed rotation is entered to compute a second TE crossing track number. A low-speed reading procedure is performed when the second TE crossing track number is greater than a third threshold value, and a high-speed reading procedure is performed when the second TE crossing track number is less than the third threshold value.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

Figure 1A:
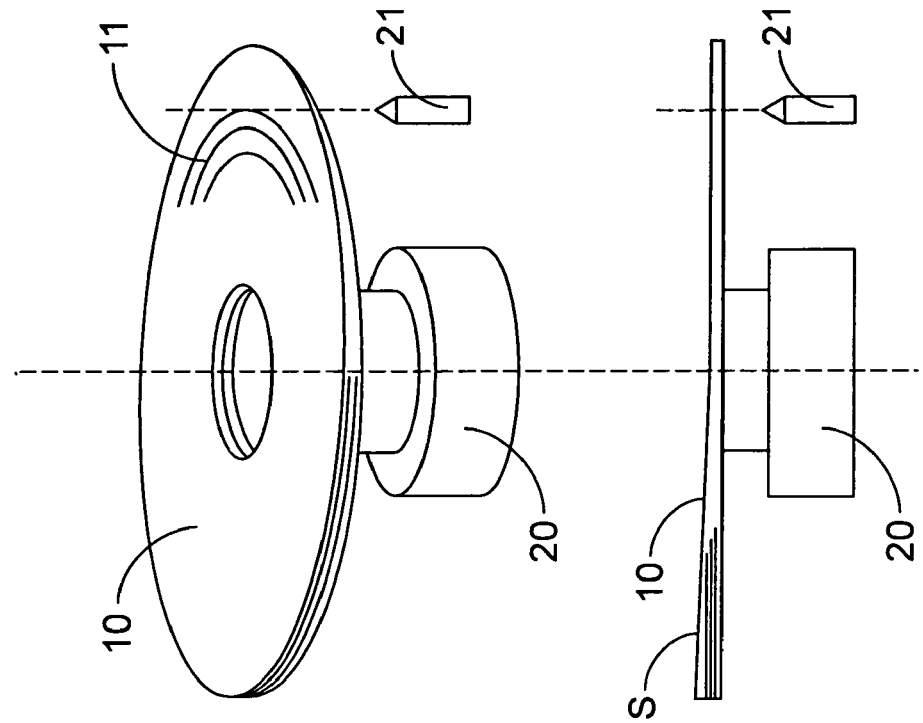
FIGS. 1(*a*) and 1(*b*) are schematic views illustrating rotation of an unbalanced disc in an open-loop test procedure.
Figure 1B:
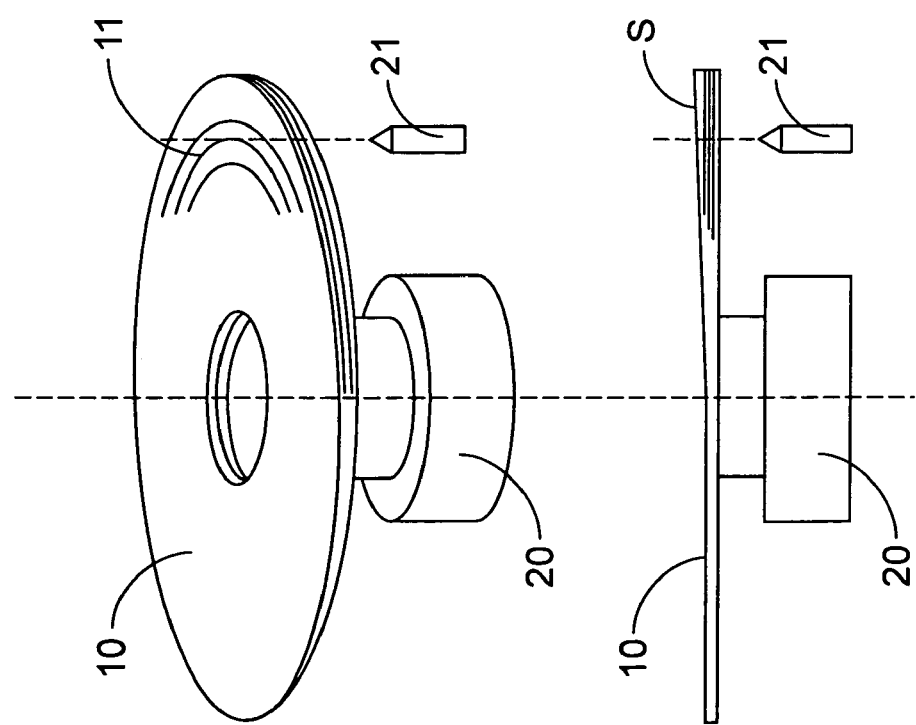
Figure 2:
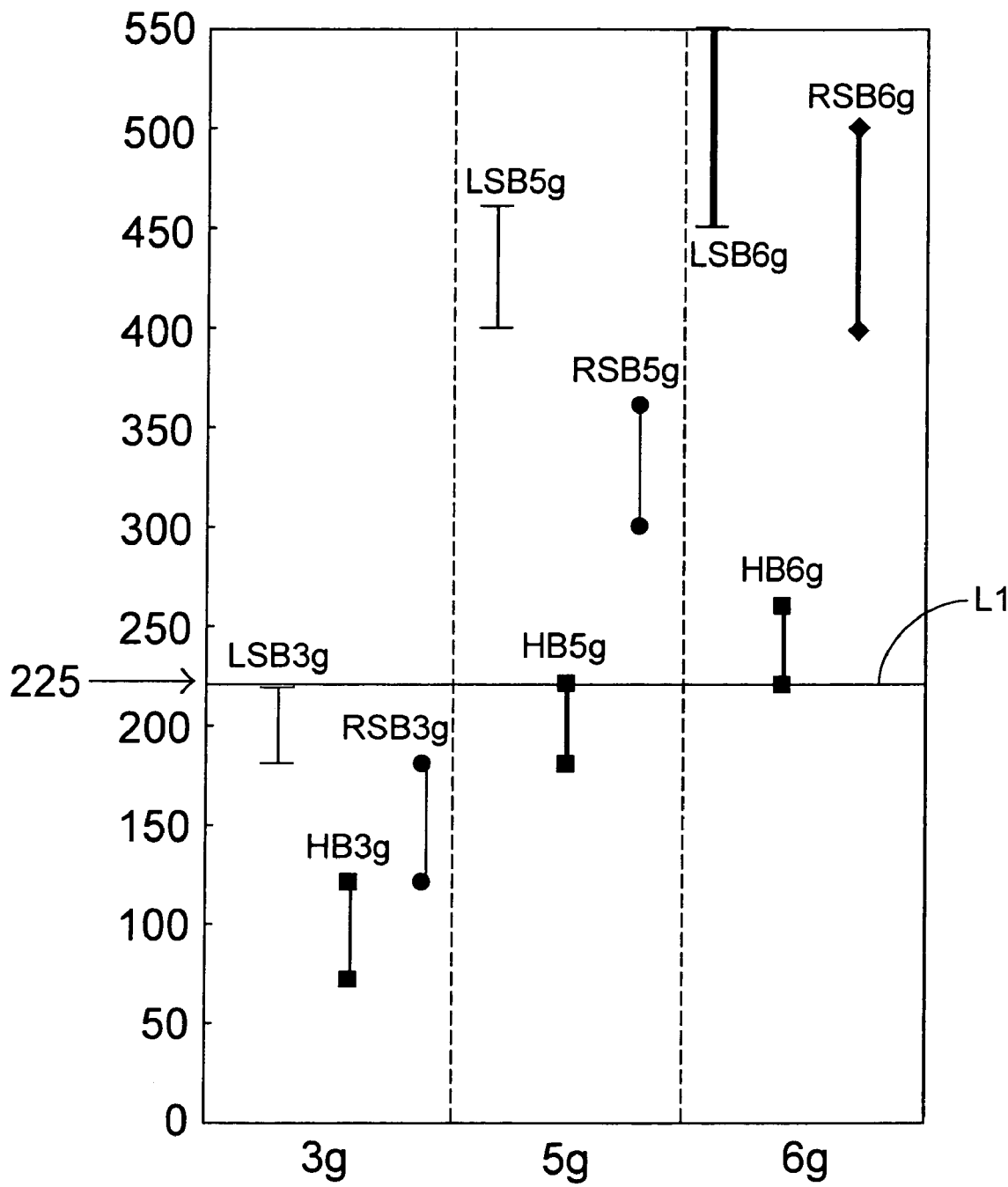
FIG. 2 is a scheme table showing the experimental data of three differentially unbalanced test discs obtained in the open-loop test procedure, which are referred to determine one threshold value for disc-balance discrimination in prior art.

From FIG. 2, it can be seen that the number of TE track-crossing for LSB3*g*, LSB5*g* and LSB6*g* are greater than RSB3*g*, RSB5*g* and RSB6*g*, respectively, and it further greater than HB3*g*, HB5*g* and HB6*g* under high testing speed of rotation, e.g. 3000 rpm. In other words, for the same disc rotating at a high speed, the vibration effect in the upright standing and leftward detecting configuration will be most severe, then the upright standing and rightward detecting configuration, and then the horizontally placed configuration. Therefore, it is possible that the disc "3*g*" has a crossing track number range overlapping that of the disc "5*g*" or "6*g*", e.g. LSB3*g* and RSB3*g* partially overlaps HB5*g* and HB6*g*, as shown in FIG. 2. Under this circumstance, if the disc "3*g*" is deemed normal and thus the TE crossing track number 225 of LSB3*g* is selected as the threshold value L1, the discs "5*g*" and "6*g*" is possibly improperly deemed normal. For distinguishing the disc "3*g*" from the discs "5*g*" and "6*g*", additional thresholds are set up to resolve the overlapping data, e.g. LSB3*g*, RSB3*g*, HB5*g* and HB6*g*, according to the present invention.

Figure 3:
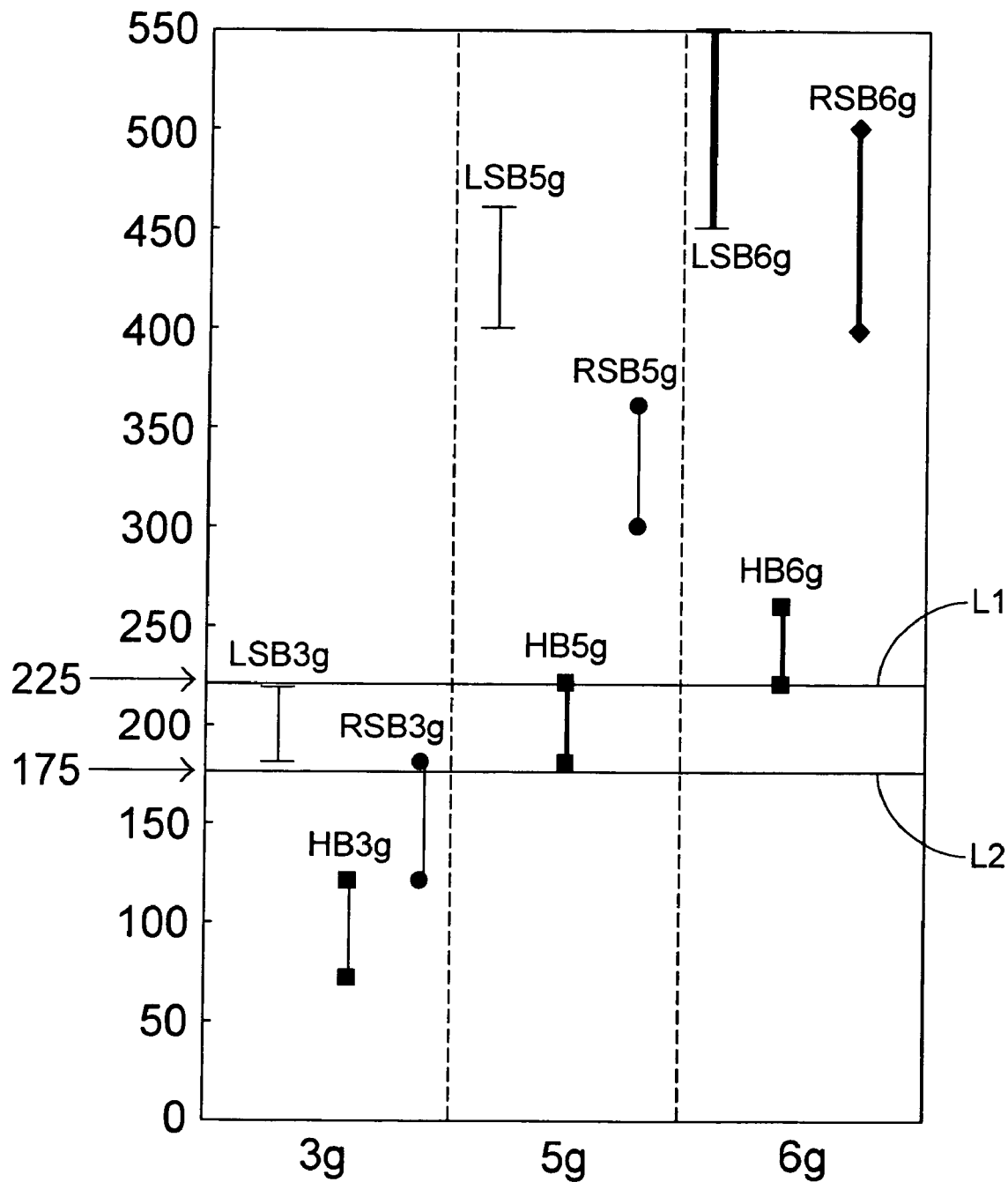
FIG. 3 is a scheme table showing the experimental data of three differentially unbalanced test discs obtained in the open-loop test procedure, which are referred to determine two threshold values for disc-balance discrimination according to an embodiment of the present invention.

Referring to FIG. 3, an additional threshold value L2 is set to be the minimum crossing track number of the discs "5*g*" and "6*g*", e.g. 175, in an embodiment of the present invention. As known in the prior art, since the disc "3*g*" of all configurations will not result in any crossing track number higher than the threshold L1, e.g. 225, it is proper to conclude that a disc detected with more than 225 crossing tracks per cycle will be considered unbalanced and read under low reading speed. Further, according to the present invention, since none of discs "5*g*" and "6*g*" of any configurations will result in a crossing track number less than 175, the additional threshold value L2 is suitable for screening out the discs "5*g*" and "6*g*". That is, a disc detected with less than 175 crossing tracks per cycle in the high rotating speed open-loop test procedure will be considered normal and read under high reading speed. As for a disc detected with crossing tracks per cycle ranged between the upper threshold 225 and lower threshold 175, it will need to be further discriminated by a low rotating speed open-loop test procedure according to a further threshold L3.

Figure 4:
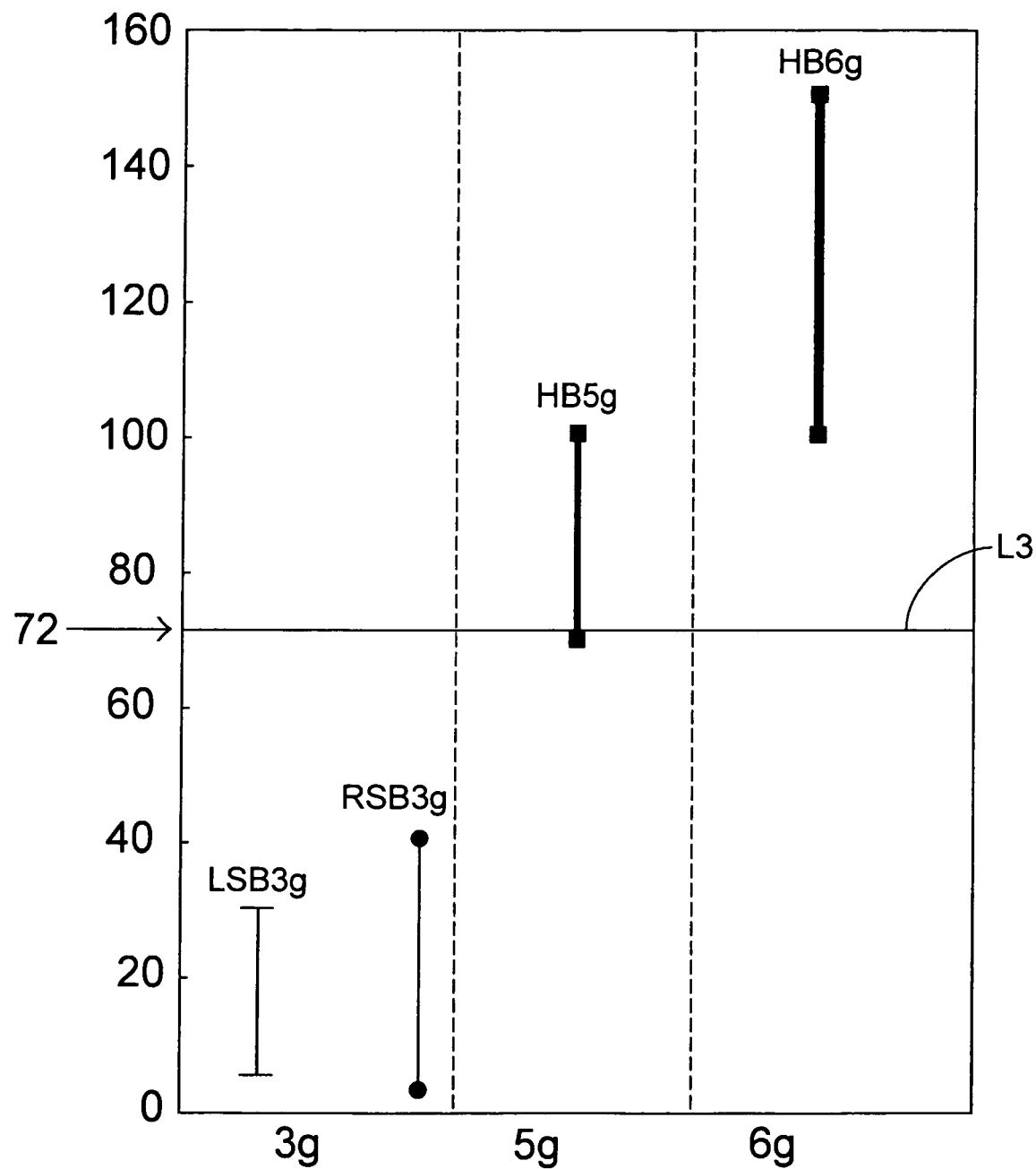
FIG. 4 is a scheme table showing further experimental data of the three differentially unbalanced test discs obtained in the open-loop test procedure, which are referred to determine an additional threshold value for further disc-balance discrimination according to an embodiment of the present invention.

In the low rotating speed open-loop test procedure, the rotating speed of the disc is set to be, for example, 2000 rpm. The optical pickup head is maintained fixed to detect the TE crossing track number. According to the experimental data of "LSB3*g*", "RSB3*g*", "HB5*g*" and "HB6*g*" realized from the low rotating speed open-loop test procedure, the threshold value L3 is preferably 72 where the disc "3*g*" with upright placement can be distinguished from the discs "5*g*" and "6*g*", with horizontal placement as shown in FIG. 4.

Figure 5:
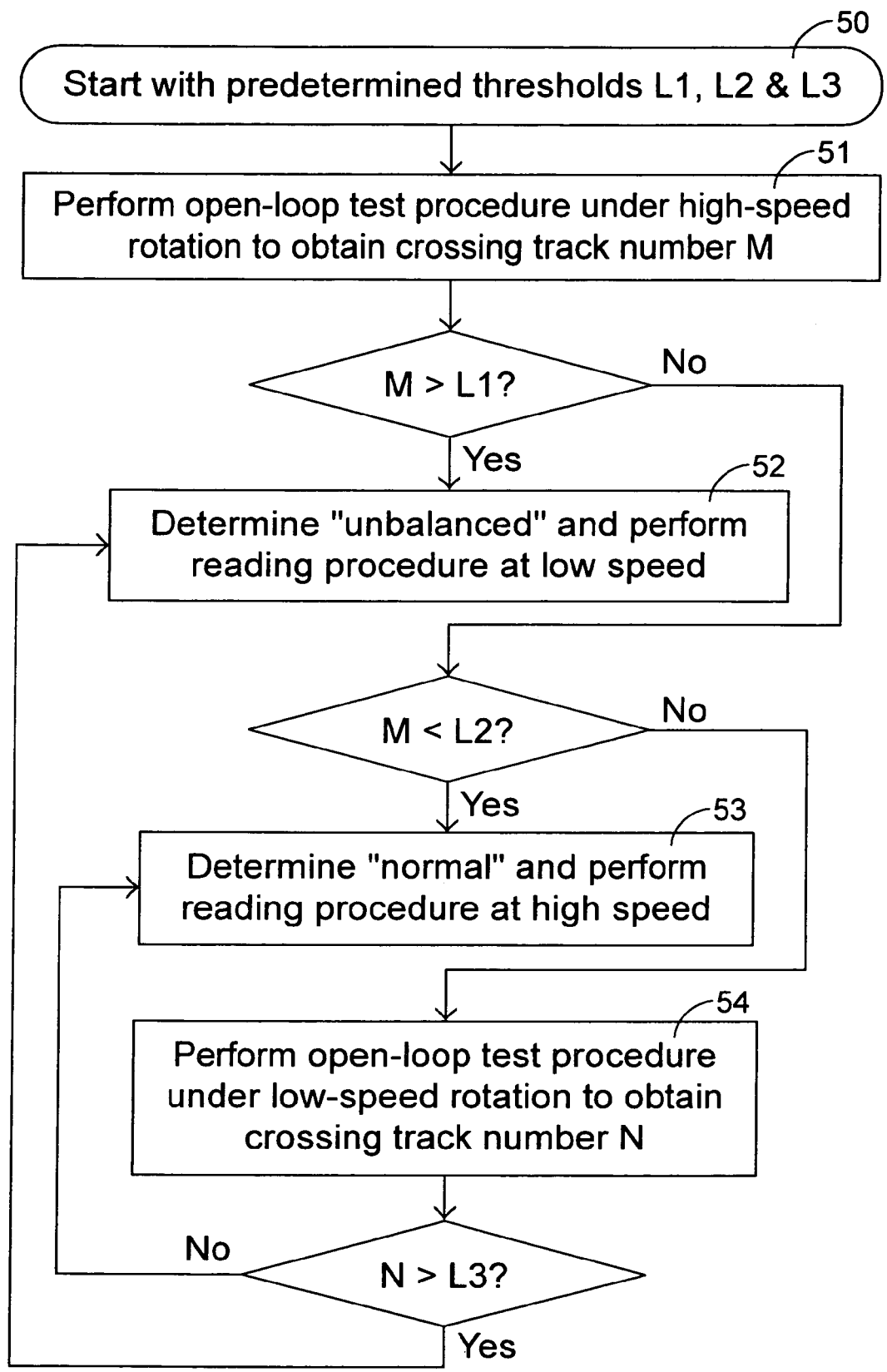
FIG. 5 is a flowchart exemplifying an open-loop test procedure for determining whether an optical disc is an unbalanced disc according to the threshold values of FIGS. 3 and 4.

Once the three threshold values L1, L2 and L3 are determined as above (Step 50), whether an optical disc loaded in the optical disc drive is normal or not can be discriminated, as illustrated in the flowchart of FIG. 5. First of all, an open-loop test procedure under a high rotating speed is entered (Step 51). In the open-loop test procedure, the optical pickup head of the optical disc drive is kept unmoved while rotating the optical disc, and the number of tracks that the optical pickup head crosses during one revolution of the disc is computed. If the number of crossing tracks M is greater than the higher threshold value L1, it means the vibration is severe and the disc is deemed an unbalanced disc (Step 52). Under this circumstance, the disc should be read at a low reading speed for avoiding reading errors. If the number of crossing tracks M is not greater than the higher threshold value L1, i.e. the disc is not determined unbalanced, another detection procedure will be optionally entered for further determining whether the disc is normal. If the number of crossing tracks M is smaller than the lower threshold value L2, it means the vibration, if any, can be ignored and the disc is deemed a normal disc (Step 53). Therefore, the disc can be read at a normally high reading speed. On the other hand, if the number of crossing tracks M is neither greater than the higher threshold value L1 nor smaller than the lower threshold value L2, another open-loop test procedure under a low rotating speed is entered (Step 54). In the open-loop test procedure, likewise, the optical pickup head of the optical disc drive is kept unmoved, and the number of tracks that the optical pickup head crosses during one revolution of the disc is computed. If the number of crossing tracks N is greater than the additional threshold value L3, the disc is deemed an unbalanced disc (Step 52). On the other hand, if the number of crossing tracks N is smaller than the threshold value L3, the disc is deemed a normal disc (Step 53). The maximum reading speed for reading an unbalanced disc is preferably lower than that for reading a normal disc. In other words, while the normal disc will be read at a normally high reading speed in the subsequent reading procedure, the unbalanced disc will be read at a low reading speed.

Figure 6:
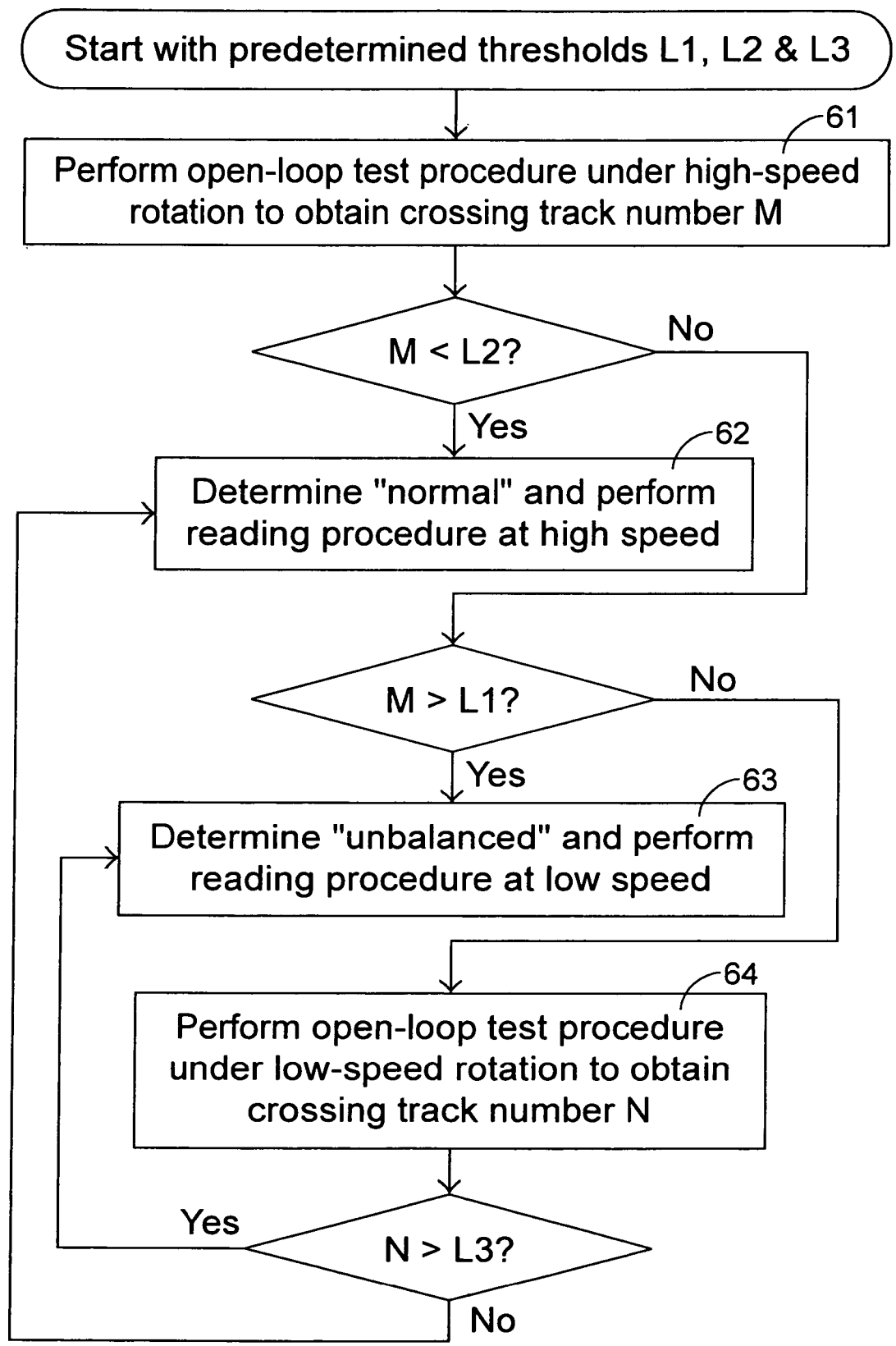
FIG. 6 is a flowchart exemplifying another open-loop test procedure for determining whether an optical disc is an unbalanced disc according to the threshold values of FIGS. 3 and 4.

Another flowchart shown in FIG. 6 reveals an example similar to that of FIG. 5. In this example, an open-loop test procedure under a high rotating speed is entered (Step 61). In the open-loop test procedure, the optical pickup head of the optical disc drive is kept unmoved while rotating the optical disc, and the number of tracks that the optical pickup head crosses during one revolution of the disc is computed. If the number of crossing tracks M is smaller than the lower threshold value L2, it means the vibration, if any, can be ignored and the disc is deemed a normal disc (Step 62). Under this circumstance, the disc can be read at a normally high reading speed. If the number of crossing tracks M is not less than the lower threshold value L2, i.e. the disc is not determined normal, another detection procedure will be optionally entered for further determining whether the disc is unbalanced. If the number of crossing tracks M is greater than the higher threshold value L1, it means the vibration is severe and the disc is deemed an unbalanced disc (Step 63). Therefore, the disc should be read at a low reading speed in order to avoid errors. On the other hand, if the number of crossing tracks M is neither greater than the higher threshold value L1 nor smaller than the lower threshold value L2, another open-loop test procedure under a low rotating speed is entered (Step 64). In the open-loop test procedure, likewise, the optical pickup head of the optical disc drive is kept unmoved, and the number of tracks that the optical pickup head crosses during one revolution of the disc is computed. If the number of crossing tracks N is greater than the additional threshold value L3, the disc is deemed an unbalanced disc (Step 63). On the other hand, if the number of crossing tracks N is smaller than the threshold value L3, the disc is deemed a normal disc (Step 62). The maximum reading speed for reading an unbalanced disc is preferably lower than that for reading a normal disc. In other words, while the normal disc will be read at a normally high reading speed in the subsequent reading procedure, the unbalanced disc will be read at a low reading speed.

According to the present invention exemplified in the flowcharts of FIG. 5 or 6, whether the disc loaded into the optical disc drive is an unbalanced or not can be determined in a more precise way and the reading speeds of the normal and unbalanced discs can be controlled differentially. In this fashion, possible reading errors resulting from inadequate reading speed can be avoided.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for detecting an unbalanced disc, comprising steps of:
   loading a disc into an optical disc drive;
   performing a first detection procedure under a first rotating speed of said disc to determine whether said disc is an unbalanced disc, wherein said first detection procedure is an open-loop test procedure in which a first TE crossing track number per revolution of said disc is computed, and said disc is determined unbalanced when said first TE crossing track number per revolution of said disc is greater than a first threshold value;
   optionally entering a second detection procedure if said disc is not determined unbalanced in said first detection procedure;
   performing said second detection procedure under a second rotating speed of said disc to determine whether said disc is a normal disc.

2. The method according to claim 1 further comprising steps of:
   entering a reading procedure in a first reading condition when said disc is determined normal; and
   entering a reading procedure in a second reading condition when said disc is determined unbalanced.

3. The method according to claim 2 wherein said second reading condition has a maximum reading speed lower than a maximum reading speed of said first reading condition.

4. The method according to claim 1 wherein said second detection procedure is an open-loop test procedure in which a second TE crossing track number per revolution of said disc is computed, and said disc is determined normal when said second TE crossing track number per revolution of said disc is less than a second threshold value.

5. The method according to claim 4 wherein said disc is determined unbalanced when said second TE crossing track number per revolution of said disc is greater than said second threshold value.

6. The method according to claim 4 wherein said second rotating speed is smaller than said first rotating speed, and said second threshold value is less than said first threshold value.

7. The method according to claim 1 wherein said second detection procedure is entered when said first TE crossing track number per revolution of said disc is less than said first threshold value but greater than a third threshold value.

8. A method for detecting an unbalanced disc, comprising steps of:
   loading a disc into an optical disc drive;
   performing a first detection procedure under a first rotating speed of said disc to determine whether said disc is a normal disc, wherein said first detection procedure is an open-loop test procedure in which a first TE crossing track number per revolution of said disc is computed, and said disc is determined normal when said first TE crossing track number per revolution of said disc is less than a first threshold value;
   optionally entering a second detection procedure if said disc is not determined normal in said first detection procedure;
   performing said second detection procedure under a second rotating speed of said disc to determine whether said disc is an unbalanced disc.

9. The method according to claim 8 further comprising steps of:
   entering a reading procedure in a first reading condition when said disc is determined normal; and entering a reading procedure in a second reading condition when said disc is determined unbalanced.

10. The method according to claim 9 wherein said second reading condition has a maximum reading speed lower than a maximum reading speed of said first reading condition.

11. The method according to claim 8 wherein said second detection procedure is an open-loop test procedure in which a second TE crossing track number per revolution of said disc is computed, and said disc is determined unbalanced when said second TE crossing track number per revolution of said disc is greater than a second threshold value.

12. The method according to claim 11 wherein said disc is determined normal when said second TE crossing track number per revolution of said disc is less than said second threshold value.

13. The method according to claim 11 wherein said second rotating speed is smaller than said first rotating speed, and said second threshold value is less than said first threshold value.

14. The method according to claim 8 wherein said second detection procedure is entered when said first TE crossing track number per revolution of said disc is greater than said first threshold value but less than a third threshold value.

15. A method for controlling a reading speed of a disc loaded in a disc reading apparatus, comprising steps of:

entering a first open-loop test procedure, in which said disc rotates at a first rotating speed and a first TE crossing track number per revolution of said disc is computed;

performing a reading procedure in a first reading condition when said first TE crossing track number per revolution of said disc is greater than a first threshold value, and performing a reading procedure in a second reading condition when said first TE crossing track number per revolution of said disc is less than a second threshold value, wherein said first threshold value is greater than said second threshold value;

entering a second open-loop test procedure, in which said disc rotates at a second rotating speed and a second TE crossing track number per revolution of said disc is computed, when said first TE crossing track number per revolution of said disc lies between said first and second threshold values; and performing a reading procedure in said first reading condition when said second TE crossing track number per revolution of said disc is greater than a third threshold value, and performing a reading procedure in said second reading condition when said second TE crossing track number per revolution of said disc is less than said third threshold value.

16. The method according to claim 15 wherein said second rotating speed is smaller than said first rotating speed, and said third threshold value is less than any of said first and second threshold values.

17. The method according to claim 16 wherein said first reading condition has a maximum reading speed lower than a maximum reading speed of said second reading condition.

* * * * *